Patented July 26, 1927. 1,636,978

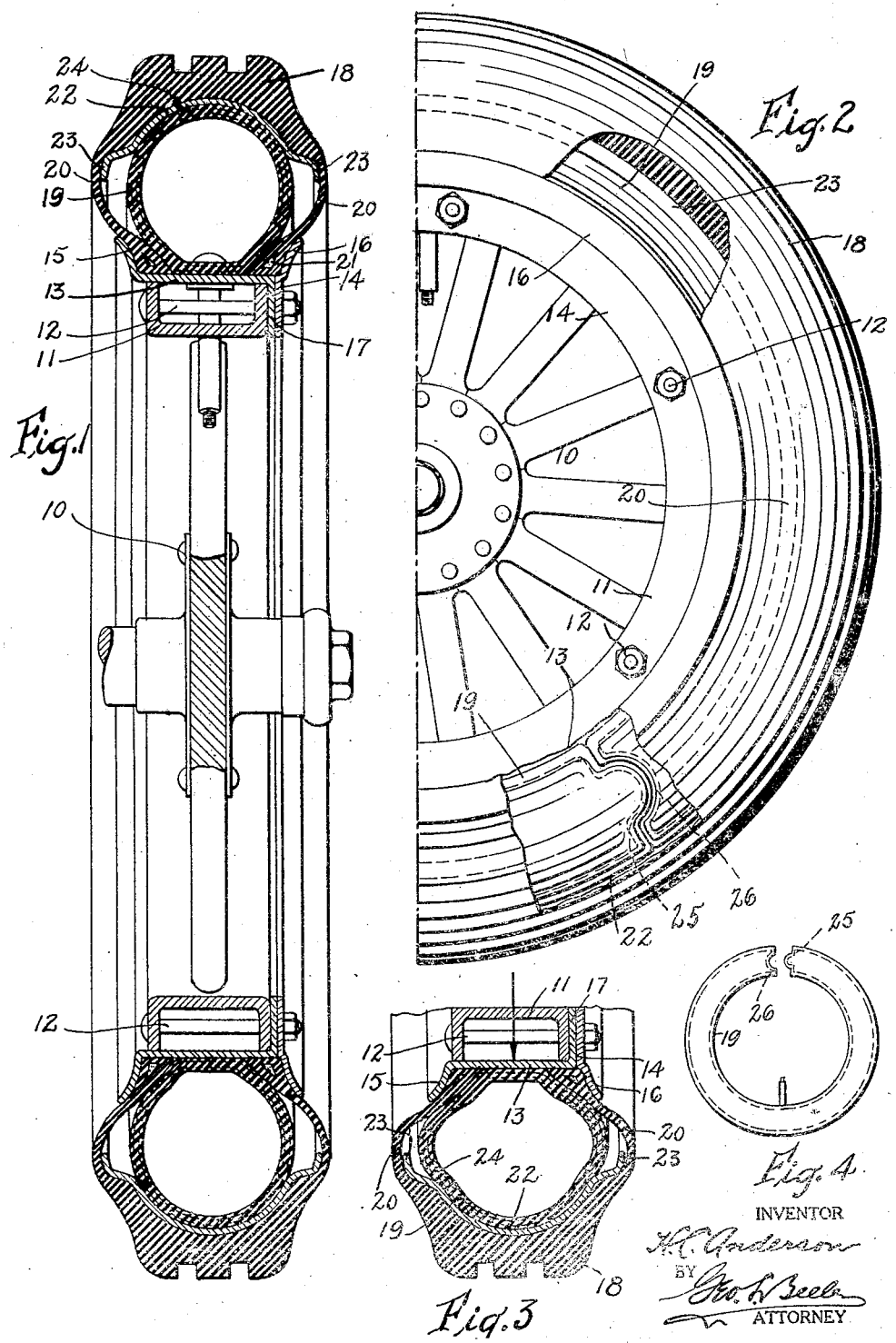

UNITED STATES PATENT OFFICE.

HIRAM C. ANDERSON, OF NEW YORK, N. Y.

PUNCTUREPROOF PNEUMATIC TIRE.

Application filed August 29, 1925. Serial No. 53,337.

This invention relates to tire construction and has particular reference to devices of that general nature which comprise a pneumatic inner supporting tire and an outer protecting shell of special wear resisting qualities and characteristics.

Among the objects of this invention is to provide tire construction comprising inner resilient supporting means and outer shell means inclosing said supporting means in a novel manner to simulate the appearance and action of a conventional tire as desired.

Another object of this invention is to provide tire construction comprising an inner supporting pneumatic tire or the like, and means inclosing said tire in a novel manner to simulate the appearance of a conventional tire and to secure improved wear resisting characteristics of said tire construction in that an even distribution of load is provided for.

Another object of this invention is to provide tire construction comprising inner supporting means and an outer construction co-operating therewith in a novel manner to prevent the entrance of dirt.

Another object of this invention is to provide tire holding means of simple and inexpensive construction and adapted particularly for rapid assemblage as well as to provide for interchangeability.

Another object of this invention is to provide tire construction comprising an inner supporting tire, an outer protecting shell, and means co-operating with the inner tire and said protecting shell to render the body stiffness of the former available to support said protecting shell.

Still another object of this invention is to provide tire construction having an inner tire or analagous pneumatic or resilient load supporting device, wherein said inner tire is arranged to be inserted into said tire construction in a novel manner as by being threaded thereinto.

With the foregoing and other objects in view the invention consists in the combination and arrangement of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which:—

Figure 1 is a sectional view showing a typical use of my invention on an artillery wheel.

Fig. 2 is a view in elevation on a reduced scale of a half of the wheel and tire construction with parts broken away to show internal structure.

Fig. 3 is a sectional view of a portion of the structure shown in Fig. 1 but acted upon by a load while the inner tire is partly or wholly deflated.

Fig. 4 is a view on a reduced scale showing the inner tire.

Referring now more specifically to the drawings, I show my novel tire construction mounted upon a wheel of any suitable form such as the artillery wheel 10 which is provided with the usual hub and spokes and with a rim 11 of channel form or the like adapted to receive bolts 12 or similar means which are arranged to co-operate so as to retain tire holding means securely in engagement with the rim. Said tire holding means takes preferably the form of a plurality of co-operating members 13 and 14 which are adapted to afford lateral support to the tire structure to be mounted on the wheel in accordance with the objects of this invention. Both of the members 13 and 14 comprise for this purpose annular flanges 15 and 16 which lie upon opposite sides of the wheel. The member 13 is arranged to be slipped over the rim 11 laterally as well as to directly engage the member 14; and is provided with a flange 17 extending so as to lie at a side of the rim of the wheel in position to be engaged by said bolt. The member 13 thus resembles a structural Z bar. The tire holding means are adapted to be mounted in place from the same side of the wheel, the member 14 lying against the flange 17 which in turn is positioned against the rim of the wheel. The specific manner of attachment or co-operation of the tire holding means with the wheel is to be understood as being subsidiary to the main principle of the construction which embodies a tire holding means that can be mounted on the rim of a wheel by being slipped thereover laterally. The tire holding means is adapted for use in connection with tires of widely varying form.

This invention provides a novel tire construction including outer shell means such as the cushion or protecting member 18 which is formed of rubber or other suitable material. The outer shell means rests upon inner supporting means, which is preferably of a resilient nature. The inner supporting means takes for this purpose the form of a pneumatic tube or tire 19. Said inner supporting means is positioned in any suitable manner between the tire holding means and the outer shell means so as to transmit the load to the wheel, means being provided including the flanges 15 and 16 to retain the inner tire in position on the wheel. The outer cushion member is arranged to simulate the appearance of any tire as desired, and is made for this purpose to wholly enclose the inner supporting means, whereby likewise the entrance of dirt is prevented. Said outer means is thus seen to embody a hollow member or tire of sufficient capacity to enclose the supporting means. Particularly the outer tire is so formed as to provide for the necessary movement of the inner means in course of normal operation on a vehicle and due to the resilience thereof. For this purpose the side portions 20 of the outer tire are arranged to be movable with respect to the wheel, and are preferably of relatively thin form for this purpose so as to be flexible. The members 20 are secured at their edges to a relatively fixed part or member and so as to provide a tight enclosure in the outer tire. For the sake of simplicity the members or flanges 20 co-operate directly with the tire holding means and lie within the side flanges 15 and 16 thereof and in abutment between the inner tire and said side flanges. The members 20 are preferably formed of somewhat extended or enlarged section at their edges as shown at 21 so as to be retained securely between said inner tire and said side flanges. It will now be seen that should the wheel be subjected to an extraordinary load or to shock, the side portions of the outer tire at the bottom of the wheel would be distended or bulge outwardly, while the side portions of the outer tire at the portion of the wheel which is momentarily uppermost would become substantially flat or straight. This free play or movement is facilitated by forming the side portions of the outer tire in curved or outwardly convexed form to such degree as may be required.

The outer tire or protecting means is so arranged as to provide for suitable load sustaining qualities in the tire construction in connection with the inner resilient supporting means. Preferably stiffening means is provided such as an annular member or ring 22 which co-operates with the inner part of the outer tire, such as the portion thereof adjacent to the tread. This construction can be manufactured by moulding the outer tire directly about the ring member 22. Said member is concaved inwardly, or otherwise arranged to co-operate suitably with the inner tire. Means is provided adjacent to the side portions of the outer tire and in relative proximity to the tread thereof to brace the side portions of said outer tire. This means may take any suitable form or structure but for the sake of simplicity and economy, I prefer to provide the stiffening member with annular side flanges 23. Said flanges 23 are arranged in predetermined relation with respect to the flanges 15 and 16 and are spaced therefrom to provide for a movement of the side portions of the outer tire therebetween as set forth hereinbefore. Moreover, and attention is particularly directed to this, said stiffening member has co-operation in connection with the tire holding or supporting means and the inner resilient means to limit the movement of the outer tire inwardly toward the axis of the wheel when the resilient means fails to function properly as in the event of deflation of the inner tire. The specific form which this invention takes will now be described.

The inner tire is so constructed as to withstand any abnormal stress to which it might be subjected as in the event of deflation and the like when the inner tire is operative to limit the inward movement of the outer structure toward the axis of the wheel in order to retain the flanges 23 spaced from the flanges 15 and 16 and guard the side portions 20 of the outer tire against excessive strain or cutting action between said flanges. For this purpose the inner member is provided with stiffening means to limit the collapse or deflection of the tread thereof as when subjected to impact, and preferably said stiffening means takes the form of an increased body mass and of a cord structure 24 to strengthen the same. When deflated under load, or subjected to an unusual strain, the inner tire will assume a form as shown in Fig. 3, the sides thereof bulging into the pockets formed within the sides of the outer tire.

The inner tire comprises a member having an end wall to permit the member to be threaded into the outer tire from an end thereof, to facilitate the insertion of said inner tire owing to the stiffness thereof. Thus said inner tire is split by a pair of walls 25 and 26, which, however, are formed to interlock with each other, the former constituting a projection or lug, and the latter a cup to receive the same.

By using a leak proof cap or connection for the air valve, my tire construction can be used almost indefinitely without the necessity of replenishing the air supply.

I claim:

1. A tire casing consisting of a resilient member re-enforced at its inner surface adjacent to its tread by an annular member bearing securely against the resilient member, said annular member being substantially of arcuate cross section adjacent to said tread portion, the tread portion being relatively heavy and the sides of the casing being hollowed out to provide inwardly opening annular side pockets disposed between said sides and the circle formed by extending the arc of the annular member, the annular member having annular side flanges entering the pockets and bearing against the body of the casing and in the direction of the tread portion thereof.

2. A tire casing as set forth in claim 1 wherein said annular side flanges are provided with edge portions bent inward toward the axis of the casing and arranged to bear laterally against the sides of the casing.

In testimony whereof I affix my signature.

HIRAM C. ANDERSON.